United States Patent
Handfest et al.

(10) Patent No.: US 11,318,603 B2
(45) Date of Patent: May 3, 2022

(54) DELTA ROBOT HAVING AN INPUT MEANS

(71) Applicant: KUKA Deutschland GmbH, Augsburg (DE)

(72) Inventors: Alexander Handfest, Hollenbach (DE); Victor Klein, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 0 days.

(21) Appl. No.: 16/962,706

(22) PCT Filed: Jan. 16, 2019

(86) PCT No.: PCT/EP2019/051003
§ 371 (c)(1),
(2) Date: Jul. 16, 2020

(87) PCT Pub. No.: WO2019/141707
PCT Pub. Date: Jul. 25, 2019

(65) Prior Publication Data
US 2020/0338719 A1    Oct. 29, 2020

(30) Foreign Application Priority Data

Jan. 19, 2018   (DE) ..................... 10 2018 200 892.2

(51) Int. Cl.
*B25J 9/10*    (2006.01)
*B25J 9/00*    (2006.01)
*B25J 19/00*   (2006.01)

(52) U.S. Cl.
CPC ......... *B25J 9/0051* (2013.01); *B25J 19/0004* (2013.01); *B25J 9/10* (2013.01)

(58) Field of Classification Search
CPC ......... B25J 9/0051; B25J 19/0004; B25J 9/10
See application file for complete search history.

(56) References Cited

U.S. PATENT DOCUMENTS 4,931,711 A * 6/1990 Naruo ............... B25J 13/02
                                              318/112
4,976,582 A   12/1990 Clavel
(Continued)

FOREIGN PATENT DOCUMENTS

DE        69930009 T2    8/2006
DE     102015012962 A1   4/2017
(Continued)

OTHER PUBLICATIONS

European Patent Office; International Preliminary Report on Patentability in related International Patent Application No. PCT/EP2019/051003 dated Jul. 21, 2020; 7 pages.
(Continued)

*Primary Examiner* — William C Joyce
(74) *Attorney, Agent, or Firm* — Dorton & Willis, LLP

(57) ABSTRACT

A delta robot includes a robot base, an end effector carrier that can be positioned in space, and three parallelogram articulated couplings which connect the end effector carrier to the robot base and are designed to connect the end effector carrier in a displaceable manner while maintaining its orientation in space relative to the robot base. Each parallelogram articulated coupling can be displaced, driven by a motor, to automatically move the end effector carrier, wherein each motor can be braked by means of a brake in order to automatically stop the end effector carrier and/or to hold the end effector carrier in its present position. The end effector carrier comprises at least one input device connected to the brakes by control technology and designed to release the brakes in an actuated switching state of the input device such that the end effector carrier is manually displaceable.

12 Claims, 2 Drawing Sheets

(56) References Cited

U.S. PATENT DOCUMENTS

| | | | |
|---|---|---|---|
| 5,783,922 A * | 7/1998 | Hashimoto | B25J 13/02 |
| | | | 318/568.11 |
| 8,714,903 B2 | 5/2014 | Feng | |
| 2017/0173792 A1 | 6/2017 | Takano et al. | |
| 2018/0345505 A1 | 12/2018 | Haddadin | |

FOREIGN PATENT DOCUMENTS

| | | |
|---|---|---|
| EP | 0333874 A1 | 9/1989 |
| EP | 0250470 B1 | 7/1991 |
| EP | 0788865 A1 | 8/1997 |
| JP | 2013215864 A | 10/2013 |
| JP | 2017100225 A1 | 6/2017 |
| WO | 0032363 A1 | 6/2000 |
| WO | 2017060539 A1 | 4/2017 |

OTHER PUBLICATIONS

European Patent Office; Search Report in related International Patent Application No. PCT/EP2019/051003 dated Jun. 6, 2019; 15 pages.

German Patent Office; Search Report in related German Patent Application No. 10 2018 200 892.2 dated Jan. 8, 2019; 7 pages.

* cited by examiner

DELTA ROBOT HAVING AN INPUT MEANS

CROSS-REFERENCE TO RELATED APPLICATIONS

This application is a national phase application under 35 U.S.C. § 371 of International Patent Application No. PCT/EP2019/051003, filed Jan. 16, 2019 (pending), which claims the benefit of priority to German Patent Application No. DE 10 2018 200 892.2, filed Jan. 19, 2018, the disclosures of which are incorporated by reference herein in their entirety.

TECHNICAL FIELD

The invention relates to a delta robot comprising a robot base, an end effector carrier that can be positioned in space, and three parallelogram articulated couplings which connect the end effector carrier to the robot base and are designed to connect the end effector carrier in a displaceable manner while maintaining its orientation in space relative to the robot base, wherein each parallelogram articulated coupling can be displaced, driven by a motor, in order to automatically move the end effector carrier, wherein each motor can be braked by means of a brake in order to automatically stop the end effector carrier and/or to hold the end effector carrier in its present position.

BACKGROUND

A delta robot is known from DE 699 30 009 T2, in which a movable element is positioned in relation to a fixed element. Three drive means each drive their own connecting device, which is arranged between the fixed and the movable elements. The connecting devices can include rods arranged in multiple joint systems, and the joints can comprise ball joints.

SUMMARY

The object of the invention is to create a delta robot that can be easily adjusted in a manual driving mode.

According to the invention, this object is achieved by a delta robot comprising a robot base, an end effector carrier that can be positioned in space, and three parallelogram articulated couplings which connect the end effector carrier to the robot base and are designed to connect the end effector carrier in a displaceable manner while maintaining its orientation in space relative to the robot base, wherein each parallelogram articulated coupling can be displaced, driven by a motor, in order to automatically move the end effector carrier, wherein each motor can be braked by means of a brake in order to automatically stop the end effector carrier and/or to hold the end effector carrier in its present position, and wherein the end effector carrier comprises at least one input means which is connected to the brakes in terms of control technology and is designed to release the brakes in an actuated switching state of the input means in such a way that the end effector carrier is manually displaceable.

Within the scope of the invention, the motor, in particular, can be formed by an electric motor or can be formed by an electric drive comprising an electric motor and at least one transmission. Within the scope of the invention, any motor, in particular also non-electric motors, can form a drive unit consisting of motor and transmission. Any motor or any drive comprising a motor and a transmission can form a drive unit which also directly comprises a brake. However, the associated brake, if necessary, can also be arranged separately from the drive unit, at any desired location within the particular drive train which connects the motor, in terms of drive, to the associated parallelogram articulated coupling.

Each parallelogram articulated coupling can comprise a lever that is pivotally mounted on the robot base and that can be automatically pivoted about a pivot axis by means of a motor. At a distal end of each lever there are arranged two bearings spaced apart from each other, on each of which there is mounted, in articulated fashion, a parallelogram rod by means of its proximal end portion. The two parallelogram rods always extend parallel to each other and are coupled to the end effector carrier by means of their distal end portions on two bearings spaced apart from each other, more specifically in such a way that the end effector carrier, due to its coupling to the robot base via the three parallelogram articulated couplings, can only be repositioned in the three spatial directions, i.e. it can be displaced or adjusted, but always retains its three orientations in space. In the case of a planar robot base and a planar end effector carrier, the end effector carrier always moves parallel to the robot base in space. In particular, three parallelogram articulated couplings can be provided for this purpose, which are arranged on the robot base offset to each other by 120 angular degrees. In this respect, the three parallelogram articulated couplings or the levers mounted on the robot base are each mounted automatically pivotally about a pivot axis by means of a motor, which pivot axis is oriented by 120 angular degrees to the pivot axis of the adjacent parallelogram articulated coupling or the adjacent lever. Corresponding parallelogram articulated couplings and in particular a corresponding exemplary delta robot is disclosed, for example, in EP 0 250 470 B1. One, more, or all of the joints coupling the rods of the parallelogram articulated couplings can be designed as ball joints.

In the case of a specific embodiment, the delta robot can comprise a robot base comprising a base plate on which three rotary bearings are arranged, evenly distributed over a circumference by 120 angular degrees and offset from each other, each of which rotary bearings comprises a rotation axis that extends in particular horizontally. A lever is mounted pivotally on each of these rotary bearings. The lever can be pivoted up and down, driven by an associated, in particular electric, motor. The proximal end portion of each lever is, in this respect, mounted on the base plate so as to be pivotable about the rotation axis of the corresponding rotary bearing. Two ball heads are arranged at a fixed distance from each other at a distal end portion of each lever. A rod of the corresponding parallelogram articulated coupling is mounted on each ball head. For this purpose, each rod comprises a proximal rod end portion, which comprises a ball socket that forms a ball joint together with the associated ball head of the lever. At its distal rod end portion, each rod of a parallelogram articulated coupling comprises a further ball socket. Further ball heads are mounted in these further ball sockets and are, in turn, rigidly connected to the end effector carrier. Two ball heads, associated with each other, of the end effector carrier are arranged in each case at a fixed distance from each other to ensure parallelism of the two rods of each parallelogram articulated coupling.

Since the end effector carrier comprises at least one input means which is connected to the brakes in terms of control technology and which is designed to release the brakes in an actuated switching state of the input means, in such a way that the end effector carrier can be adjusted manually, a delta robot is created which can be easily adjusted in a manual driving mode.

By positioning the input means, which can be a brake release push button, on the end effector carrier of the delta robot, the input means is always accessible to an operator. When the input means is actuated, the component held by the end effector can be held directly in the hand that is to be moved, while at the same time the input means can be accessed by a hand. Thus, the robot flange, i.e. the end effector carrier, can be manually positioned easily, intuitively and precisely. The end effector carrier can also be referred to as a parallel plate.

The brakes can be designed as electrically actuated brakes, the at least one input means can be an electrically actuated input means, and the input means can be connected to the brakes by means of electrical cables.

The input means can, for example, be designed as a push button, a push switch or a rocker switch.

The at least one input means can be electrically connected to the brakes directly, in particular bypassing a robot controller of the delta robot.

The brakes of the motors can be connected to the robot controller in such a way that the brakes can be selectively released or closed by a control signal of the robot controller, wherein the input means is connected to the robot controller and the robot controller is designed to release or close the brakes depending on the switching state of the input means.

The motors can each comprise an electric, in particular electromagnetic, actuator, which in each case is designed to actuate the brake of the corresponding motor, more specifically in such a way that in an energized state of the actuator the brake is released, and in an unenergized state of the actuator the brake is closed, and the input means is designed and set up to energize the actuator when the input means is actuated, in order to release the brake.

In this case, an energized state of the actuator means that the actuator is supplied with electrical energy in this state, and the electrical energy keeps the actuator in an actuated state in order to release the brake or keep the brake released.

In this case, an unenergized state of the actuator means that in this state a supply of electrical energy to the actuator is interrupted, and, due to the lack of energy supply, the actuator can no longer keep the brake in an actuated state of the actuator, in which the brake is released, which causes the actuator to drop, i.e. the actuator automatically enters another state, in which it closes the brake. The actuator can, for example, comprise a lifting magnet.

The motors can each comprise an electric, in particular electromagnetic, actuator, which in each case is designed to actuate the brake of the corresponding motor, more specifically in such a way that in an energized state of the actuator the brake is closed and in an unenergized state of the actuator the brake is released, and the input means is designed and set up to interrupt the electric power supply to the actuator when the input means is actuated, in order to release the brake.

An energized state of the actuator means, in this case, that the actuator is supplied with electrical energy in this state, the electrical energy keeping the actuator in an actuated state in order to close the brake or keep the brake closed.

An unenergized state of the actuator means, in this case, that in this state a supply of electrical energy to the actuator is interrupted, and, due to the lack of energy supply, the actuator can no longer keep the brake in an actuated state of the actuator, in which the brake is closed, whereby the actuator drops, i.e. the actuator automatically enters another state, in which it releases the brake. The actuator can, for example, comprise a lifting magnet.

The end effector carrier can comprise a housing with a hollow interior, and the at least one input means can be electrically contacted within the hollow interior of the housing of the end effector carrier.

An electrical cable can be connected to the at least one input means, which electrical cable is led out from the interior of the housing to the outside of the housing of the end effector carrier via a cable passage formed on the housing of the end effector carrier. The cable can be routed outside the housing along one of the parallelogram rods to the base of the delta robot.

The end effector carrier can comprise at least two or at least three input means, and the plurality of input means can be connected in terms of control technology to an evaluation device of the delta robot, in such a way that more than two switching states are realized in dependence on an actuation or non-actuation of the at least two or at least three input means, in order to be able to set additional control states in addition to controlling the brakes.

The end effector carrier can comprise a bore between each two bearing portions of adjacent parallelogram articulated couplings, in particular a threaded bore, which is designed for the optional attachment of an input means, a strain relief sleeve, or an adjustment instrument.

The typical arrangement of three arms of the delta robot creates three regions or areas on the housing which can be assigned functions. For example, one region can be used to connect the cables, and another region can be used to accommodate an input means, such as the brake release push button. The functions of the brake release push button can be expanded with appropriately designed software. A higher number of input means, such as the brake release push button, is also possible. Teaching of individual points, movements or entire programs is generally possible in a manual driving mode.

A specific embodiment of the invention is explained in more detail in the following description of the drawings, which is given with reference to the accompanying drawings. Specific features of this exemplary embodiment can represent general features of the invention, regardless of the specific context in which they are mentioned, as appropriate also considered individually or in other combinations of the features.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
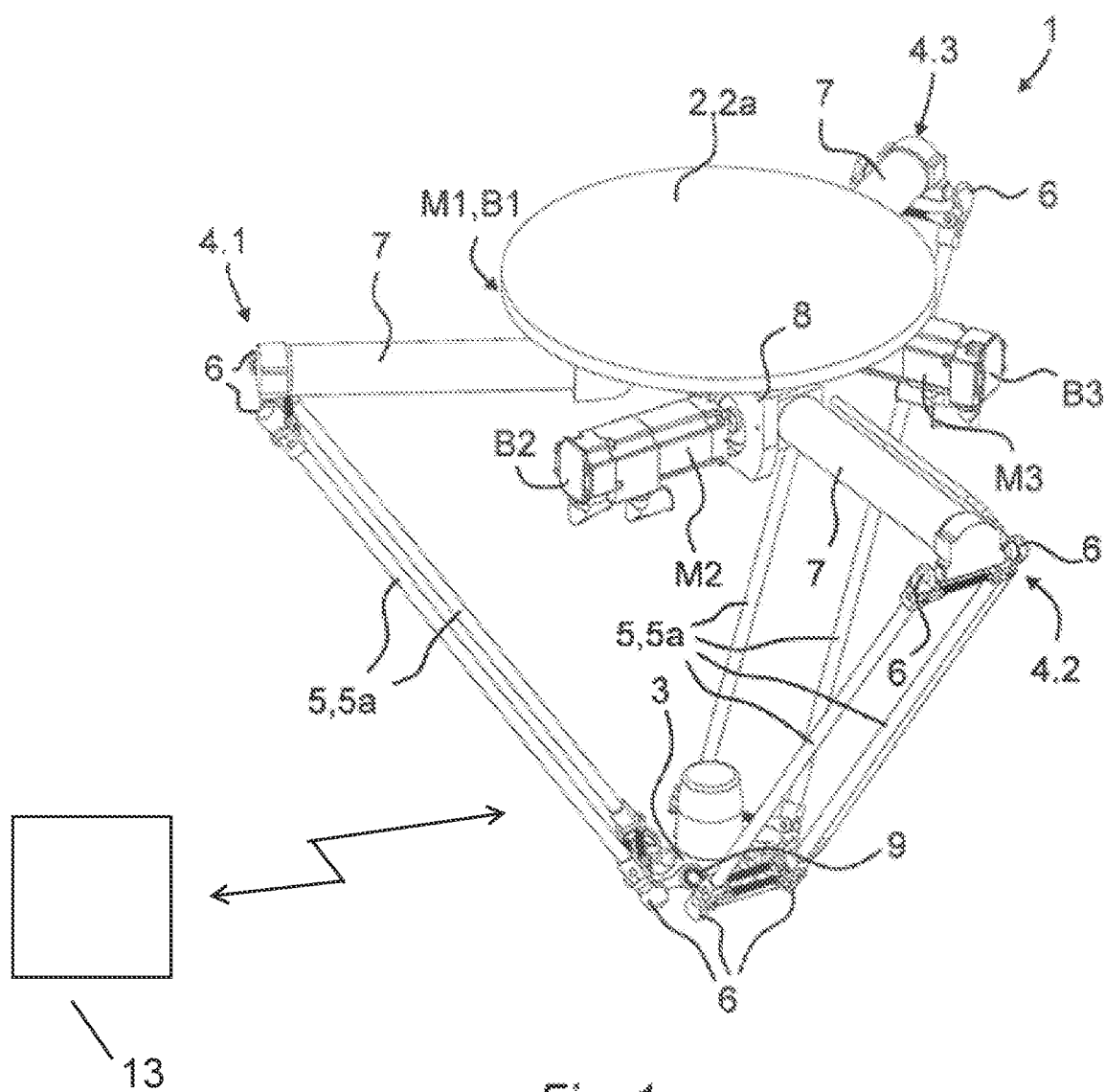
FIG. 1 shows a perspective view of an exemplary delta robot.

FIG. 1 shows a delta robot 1, comprising a robot base 2, an end effector carrier 3 that can be positioned in space, and three parallelogram articulated couplings 4.1, 4.2, 4.3 which connect the end effector carrier 3 to the robot base 1 and are designed to connect the end effector carrier 3 in a displaceable manner while maintaining its orientation in space relative to the robot base 2, wherein each parallelogram articulated coupling 4.1, 4.2, 4.3 can be displaced, driven by a motor M1, M2, M3, in order to automatically move the end effector carrier 3, and the parallelogram articulated couplings 4.1, 4.2, 4.3 comprise rods 5, which are integrated into the articulation structure of the delta robot 1 by means of ball joints 6. Each of the three motors M1, M2, M3 comprises a brake B1, B2, B3.

Each parallelogram articulated coupling 4.1, 4.2, 4.3 can therefore comprise a lever 7, which is mounted pivotally on the robot base 2 and which can be automatically pivoted about a pivot axis by means of a motor M1, M2, M3 respectively. At a distal end of each lever 7 there are arranged two bearings spaced apart from each other, on each of which there is mounted, in articulated fashion, a parallelogram rod 5a by means of its proximal end portion. The two parallelogram rods 5a always extend parallel to each other and are coupled to the end effector carrier 3 by means of their distal end portions on two bearings spaced apart from each other, more specifically in such a way that the end effector carrier 3, due to its coupling to the robot base 2 via the three parallelogram articulated couplings 4.1, 4.2, 4.3, can only be repositioned in the three spatial directions, i.e. it can be displaced or adjusted, but always retains its three orientations in space. In the case of a planar robot base 2 and a planar end effector carrier 3, the end effector carrier 3 always moves parallel to the robot base 2 in space. In particular, three parallelogram articulated couplings can be provided for this purpose, which are arranged on the robot base offset to each other by 120 angular degrees. For this purpose, in particular three parallelogram articulated couplings 4.1, 4.2, 4.3 or the levers 7 mounted on the robot base 2 are each mounted automatically pivotally about a pivot axis by means of a motor M1, M2, M3, which pivot axis is oriented by 120 angular degrees to the pivot axis of the adjacent parallelogram articulated coupling 4.1, 4.2, 4.3 or the adjacent lever 7.

In the case of the present embodiment, the delta robot 1 comprises a robot base 2, which comprises a base plate 2a, on which three rotary bearings 8 are arranged, evenly distributed over a circumference by 120 angular degrees and offset from each other, each of which rotary bearings comprises a rotation axis that extends in particular horizontally. A lever 7 is mounted pivotally on each of these rotary bearings 8. The lever 7 can be pivoted up and down, driven by an associated, in particular electric, motor M1, M2, M3. The proximal end portion of each lever 7 is, in this respect, mounted on the base plate 2a so as to be pivotable about the rotation axis of the corresponding rotary bearing 8. Two ball heads are arranged at a fixed distance from each other at a distal end portion of each lever 7. A rod 5 of the corresponding parallelogram articulated coupling 4.1, 4.2, 4.3 is mounted on each ball head. For this purpose, each rod 5 comprises a proximal rod end portion, which comprises a ball socket that forms a ball joint 6 together with the associated ball head of the lever 7. At its distal rod end portion, each rod 5 of a parallelogram articulated coupling 4.1, 4.2, 4.3 comprises a further ball socket. Further ball heads are mounted in these further ball sockets and are, in turn, rigidly connected to the end effector carrier 3, Two ball heads, associated with each other, of the end effector carrier 3 are arranged in each case at a fixed distance from each other to ensure parallelism of the two rods 5 of each parallelogram articulated coupling 4.1, 4.2, 4.3.

Figure 2:
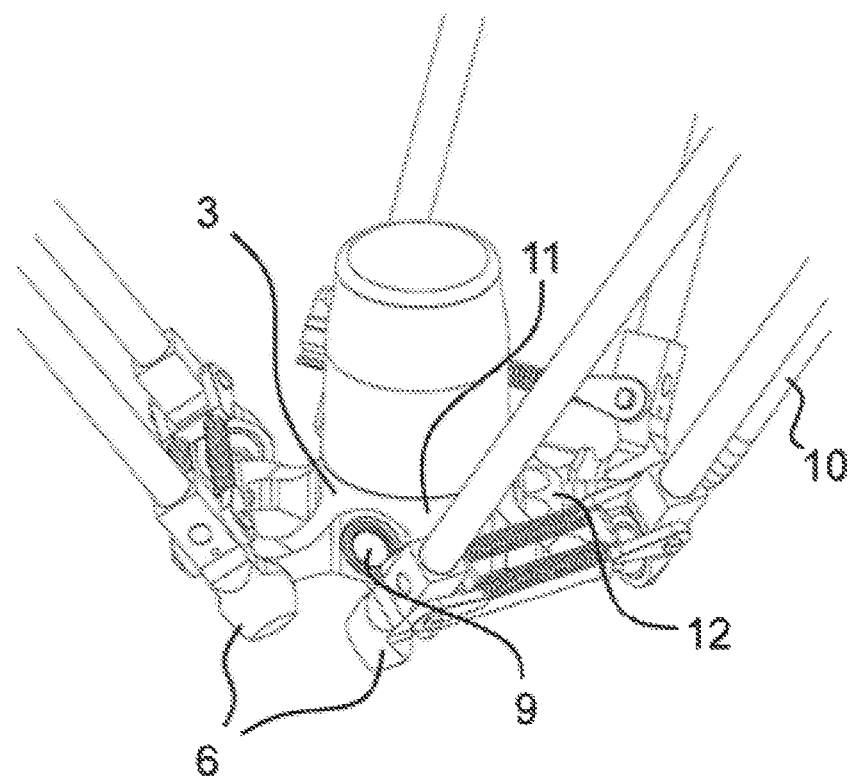
FIG. 2 shows an enlarged partial view of the exemplary delta robot according to FIG. 1 in the region of the end effector carrier, which according to the invention comprises at least one input means.
Figure 3:
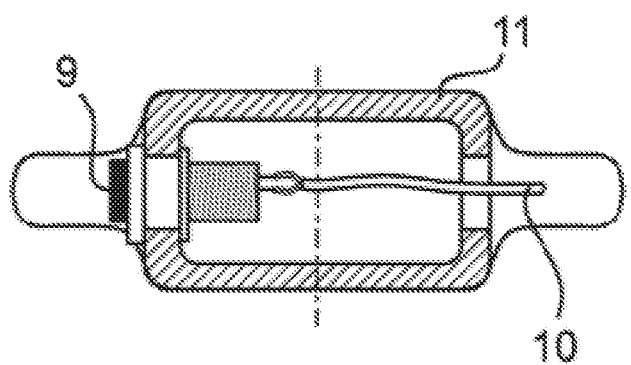
FIG. 3 shows a sectional view through the end effector carrier according to FIG. 2.

As shown in FIG. 2 and FIG. 3, the end effector carrier 3 comprises at least one input means 9, which is connected to the brakes B1, B2, B3 in terms of control technology and which is designed to release the brakes B1, B2, B3 in an actuated switching state of the input means 9, in such a way that the end effector carrier 3 can be adjusted manually.

The brakes B1, B2, B3 are designed in the case of the present embodiment as brakes B1, B2, B3 which are to be actuated electrically, wherein the at least one input means 9 is an input means 9 which is to be actuated electrically and the input means 9 is connected to the brakes B1, B2, B3 by means of an electrical cable 10.

The at least one input means 9 can be electrically connected to the brakes B1, B2, B3 directly, in particular bypassing a robot controller 13 of the delta robot 1, or the brakes B1, B2, B3 of the motors M1, M2, M3 can be connected to the robot controller 13 in such a way that the brakes B1, B2, B3 can be selectively released or closed by a control signal from the robot controller 13, wherein the input means 9 is connected to the robot controller 13 and the robot controller 13 is set up to release or to close the brakes B1, B2, B3 in dependence on the switching state of the input means 9.

The end effector carrier 3, in the case of a present embodiment, comprises a housing 11 with a hollow interior, and the at least one input means 9 is electrically contacted within the hollow interior of the housing 11 of the end effector carrier 3.

The electrical cable 10 is connected to the at least one input means 9 and is led out from the interior of the housing 11 to the outside of the housing 11 of the end effector 3 via a cable passage formed on the housing 11 of the end effector which cable passage can include a strain relief sleeve 12, for example.

The end effector carrier 3 can also comprise two or at least three input means instead of the shown single input means 9, wherein the plurality of input means 9 can be connected in terms of control technology to an evaluation device of the delta robot 1, in such a way that more than two switching states are realized in dependence on an actuation or non-actuation of the at least two or at least three input means 9, in order to be able to set additional control states in addition to controlling the brakes B1, B2, B3.

The end effector carrier 3 comprises a bore between each two bearing portions of adjacent parallelogram articulated couplings 4.1, 4.2, 4.3, in particular a threaded bore, which is designed for the optional attachment of an input means 9, a strain relief sleeve 12, or an adjustment instrument (not shown in greater detail).

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS 1 delta robot
2 robot base
2a base plate 2a
3 end effector carrier
4.1 parallelogram articulated coupling 4.2 parallelogram articulated coupling
4.3 parallelogram articulated coupling
5 rod
6 ball joint
7 lever
8 rotary bearing
9 input means
10 electrical cable
11 housing
12 strain relief sleeve
B1 brake
B2 brake
B3 brake
M1 motor
M2 motor
M3 motor

What is claimed is:

1. A delta robot, comprising:
a robot base;
an end effector carrier that can be positioned in space;
three parallelogram articulated couplings connecting the end effector carrier to the robot base and configured to connect the end effector carrier in a displaceable manner while maintaining an orientation of the end effector carrier in space relative to the robot base;
a respective motor operatively coupled with each parallelogram articulated coupling to automatically move the end effector carrier by displacing the respective parallelogram articulated coupling;
wherein each motor is configured to be braked by a respective brake in order to at least one of automatically stop a movement of the end effector carrier, or hold the end effector carrier in its present position;
wherein the end effector carrier comprises at least one input means operatively controllably coupled to the brakes and configured to release the brakes in an actuated switching state of the input means such that the end effector carrier is manually displaceable by an operator;
wherein each parallelogram articulated coupling comprises a pair of spaced parallel rods, each rod connected to the end effector carrier at a respective bearing portion of the end effector carrier; and
the end effector carrier comprises a bore between each two bearing portions of adjacent parallelogram articulated couplings, at least one of the bores configured for attachment of the input means.

2. The delta robot of claim 1, wherein:
the brakes are configured as electrically actuated brakes;
the at least one input means is an electrically actuated input means; and
the input means is connected to the brakes by an electrical cable.

3. The delta robot of claim 1, wherein the at least one input means is directly electrically connected to the brakes.

4. The delta robot of claim 3, wherein the at least one input means bypasses a robot controller of the delta robot for direct electrical connection to the brakes.

5. The delta robot of claim 1, wherein:
the brakes of the motors are connected to the robot controller such that the brakes are selectively released or closed by a control signal of the robot controller;
the input means is connected to the robot controller; and
the robot controller is configured to release or to close the brakes based on the switching state of the input means.

6. The delta robot of claim 1, wherein:
the motors each comprise an electric actuator configured to actuate the brake of the corresponding motor such that in an energized state of the actuator the brake is released, and in an unenergized state of the actuator the brake is closed; and
the input means is configured to energize the actuator when the input means is actuated in order to release the brake.

7. The delta robot of claim 6, where each motor comprises an electromagnetic actuator.

8. The delta robot of claim 1, wherein:
the motors each comprise an electric actuator configured to actuate the brake of the corresponding motor such that in an energized state of the actuator the brake is closed, and in an unenergized state of the actuator the brake is released; and
the input means is configured to interrupt the electric power supply to the actuator when the input means is actuated in order to release the brake.

9. The delta robot of claim 8, where each motor comprises an electromagnetic actuator.

10. The delta robot of claim 1, wherein:
the end effector carrier comprises a housing having a hollow interior; and
the at least one input means is electrically contacted within the hollow interior of the housing of the end effector carrier.

11. The delta robot of claim 10, further comprising an electrical cable connected to the at least one input means, wherein the electrical cable is routed out from the interior of the housing to the outside of the housing of the end effector carrier via a cable passage formed on the housing of the end effector carrier.

12. The delta robot if claim 1, wherein each bore is a threaded bore.

* * * * *